United States Patent
Bent et al.

(10) Patent No.: US 9,813,331 B2
(45) Date of Patent: Nov. 7, 2017

(54) ASSESSING RESPONSE ROUTES IN A NETWORK

(71) Applicant: INTERNATIONAL BUSINESS MACHINES CORPORATION, Armonk, NY (US)

(72) Inventors: Graham A. Bent, Southampton (GB); Thomas J. C. Berman, London (GB); Patrick Dantressangle, Chandler's Ford (GB); David R. Vyvyan, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/171,256

(22) Filed: Feb. 3, 2014

(65) Prior Publication Data

US 2014/0219278 A1 Aug. 7, 2014

(30) Foreign Application Priority Data

Feb. 5, 2013 (GB) .................................. 1302027.6

(51) Int. Cl.
*H04L 12/721* (2013.01)
*H04L 12/725* (2013.01)

(52) U.S. Cl.
CPC ............ *H04L 45/34* (2013.01); *H04L 45/308* (2013.01)

(58) Field of Classification Search
CPC ....... H04L 4/72; H04L 61/25; H04L 61/2557; H04L 45/34; H04L 45/308; H04L 12/741
USPC ........................... 370/252, 389, 392; 455/466
See application file for complete search history.

(56) References Cited

U.S. PATENT DOCUMENTS

| 5,295,256 A | 3/1994 | Bapat |
| 5,408,652 A | 4/1995 | Hayashi et al. |
| 5,418,950 A | 5/1995 | Li et al. |
| 5,701,453 A | 12/1997 | Maloney et al. |
| 5,794,229 A | 8/1998 | French et al. |
| 5,873,088 A | 2/1999 | Hayashi et al. |

(Continued)

FOREIGN PATENT DOCUMENTS

| EP | 0625756 | 1/2000 |
| WO | 2009070167 A1 | 6/2009 |

OTHER PUBLICATIONS

U.S. Appl. No. 12/248,082: Notice of Allowance Mailed Nov. 30, 2011.

(Continued)

*Primary Examiner* — Kwang B Yao
*Assistant Examiner* — Syed M Bokhari
(74) *Attorney, Agent, or Firm* — Law Office of Jim Boice

(57) ABSTRACT

Method and system are provided for assessing response routes in a network of connected nodes wherein a querying node propagates a query through multiple routes of intermediate nodes to a data source node and the data source node returns data to the querying node. The method at a data source node may include: receiving a query instance including metadata with route information of the route of intermediate nodes in the network that the query instance has travelled through from a querying node to the data source node; comparing the route information to a route policy; and responding to a query instance which meets the route policy by returning the query response via the route of intermediate nodes of the query instance.

19 Claims, 7 Drawing Sheets

(56) References Cited

U.S. PATENT DOCUMENTS

| | | | |
|---|---|---|---|
| 5,937,402 A | 8/1999 | Pandit | |
| 5,978,356 A | 11/1999 | Elwalid et al. | |
| 6,175,837 B1 | 1/2001 | Sharma et al. | |
| 6,226,649 B1 | 5/2001 | Bodamer et al. | |
| 6,226,788 B1 | 5/2001 | Schoening et al. | |
| 6,694,306 B1 | 2/2004 | Nishizawa et al. | |
| 6,708,186 B1 | 3/2004 | Claborn et al. | |
| 6,931,016 B1 | 8/2005 | Andersson et al. | |
| 6,950,823 B2 | 9/2005 | Amiri et al. | |
| 6,968,389 B1 | 11/2005 | Menditto et al. | |
| 7,099,888 B2 | 8/2006 | Gollapudi et al. | |
| 7,174,382 B2 | 2/2007 | Ramanathan et al. | |
| 7,251,653 B2 | 7/2007 | Huang et al. | |
| 7,403,956 B2 | 7/2008 | Vaschillo et al. | |
| 7,433,942 B2 | 10/2008 | Butt et al. | |
| 7,532,623 B2 | 5/2009 | Rosenzweig et al. | |
| 7,647,411 B1 | 1/2010 | Schiavone et al. | |
| 7,660,891 B2 | 2/2010 | Black | |
| 7,664,758 B1 | 2/2010 | Urano et al. | |
| 7,664,806 B1 | 2/2010 | Koudas et al. | |
| 7,716,174 B2 | 5/2010 | Lee et al. | |
| 7,725,603 B1 | 5/2010 | Kanevsky et al. | |
| 7,752,213 B2 | 7/2010 | Todd | |
| 7,783,777 B1 | 8/2010 | Pabla et al. | |
| 7,908,266 B2 | 3/2011 | Zeringue et al. | |
| 7,921,131 B2 | 4/2011 | Uppala | |
| 7,974,961 B2 | 7/2011 | Barbarek | |
| 7,984,294 B1 | 7/2011 | Goringe et al. | |
| 7,987,152 B1 | 7/2011 | Gadir | |
| 8,051,213 B2 | 11/2011 | Van Hensbergen et al. | |
| 8,139,588 B2 | 3/2012 | Hardjono et al. | |
| 8,145,652 B2 | 3/2012 | Bent et al. | |
| 8,200,684 B2 | 6/2012 | Seitz et al. | |
| 8,250,140 B2 | 8/2012 | Bent et al. | |
| 8,311,998 B2 | 11/2012 | Correll | |
| 8,560,570 B2 | 10/2013 | Bent et al. | |
| 2003/0009551 A1 | 1/2003 | Benfield et al. | |
| 2003/0061209 A1 | 3/2003 | Raboczi et al. | |
| 2003/0145105 A1* | 7/2003 | Desineni | H04L 12/2697 709/238 |
| 2003/0165139 A1 | 9/2003 | Chen et al. | |
| 2003/0208621 A1 | 11/2003 | Bowman | |
| 2003/0212664 A1 | 11/2003 | Breining et al. | |
| 2004/0044727 A1 | 3/2004 | Abdelaziz et al. | |
| 2004/0181522 A1 | 9/2004 | Jardin | |
| 2005/0038810 A1 | 2/2005 | Brodersen et al. | |
| 2005/0065925 A1 | 3/2005 | Weissman et al. | |
| 2005/0083955 A1 | 4/2005 | Guichard et al. | |
| 2005/0096124 A1 | 5/2005 | Stronach | |
| 2005/0138073 A1 | 6/2005 | Zhou et al. | |
| 2005/0182758 A1 | 8/2005 | Seitz et al. | |
| 2005/0223022 A1 | 10/2005 | Weissman et al. | |
| 2005/0246338 A1 | 11/2005 | Bird | |
| 2006/0004750 A1 | 1/2006 | Huang et al. | |
| 2006/0031439 A1 | 2/2006 | Saffre | |
| 2006/0053112 A1 | 3/2006 | Chitkara et al. | |
| 2006/0133428 A1 | 6/2006 | Guthrie et al. | |
| 2006/0136363 A1 | 6/2006 | Nguyen et al. | |
| 2006/0136469 A1 | 6/2006 | Dettinger et al. | |
| 2006/0225072 A1 | 10/2006 | Lari et al. | |
| 2006/0259607 A1 | 11/2006 | O'Neal et al. | |
| 2006/0265396 A1 | 11/2006 | Raman et al. | |
| 2006/0294065 A1 | 12/2006 | Dettinger et al. | |
| 2007/0002869 A1 | 1/2007 | Miller | |
| 2007/0043697 A1 | 2/2007 | Driesch et al. | |
| 2007/0083347 A1 | 4/2007 | Bollobas et al. | |
| 2007/0143369 A1 | 6/2007 | Uppala | |
| 2007/0239759 A1 | 10/2007 | Shen et al. | |
| 2007/0297405 A1* | 12/2007 | He | H04L 45/00 370/389 |
| 2008/0043634 A1 | 2/2008 | Wang et al. | |
| 2008/0263022 A1 | 10/2008 | Kostorizos et al. | |
| 2008/0291926 A1 | 11/2008 | Hayashi | |
| 2008/0310302 A1 | 12/2008 | Detwiler et al. | |
| 2009/0063453 A1 | 3/2009 | Adler et al. | |
| 2009/0063524 A1 | 3/2009 | Adler et al. | |
| 2009/0077036 A1 | 3/2009 | Bent et al. | |
| 2009/0157684 A1 | 6/2009 | Anderson et al. | |
| 2009/0193006 A1 | 7/2009 | Herrnstadt | |
| 2009/0252161 A1* | 10/2009 | Morris | H04L 45/124 370/389 |
| 2010/0042633 A1* | 2/2010 | Gotlieb | G06F 9/546 709/206 |
| 2010/0094902 A1 | 4/2010 | Vyvyan | |
| 2010/0100556 A1 | 4/2010 | Correll | |
| 2012/0167160 A1* | 6/2012 | Carney et al. | 726/1 |
| 2012/0179720 A1 | 7/2012 | Seitz et al. | |
| 2012/0281540 A1 | 11/2012 | Khan et al. | |
| 2012/0303609 A1* | 11/2012 | Bent | G06F 17/30545 707/716 |
| 2013/0157699 A1* | 6/2013 | Talwar | H04L 51/18 455/466 |
| 2014/0105038 A1* | 4/2014 | Yu | H04L 43/065 370/252 |

OTHER PUBLICATIONS

U.S. Appl. No. 12/248,082: Final Office Action Mailed Apr. 27, 2011.

U.S. Appl. No. 12/248,082: Non-Final Office Action Mailed Jan. 4, 2011.

U.S. Appl. No. 12/101,220: Final Office Action Mailed Oct. 14, 2010.

U.S. Appl. No. 12/101,220: Non-Final Office Action Mailed Apr. 30, 2010.

U.S. Appl. No. 12/203,719: Final Office Action Mailed Jul. 8, 2013.

U.S. Appl. No. 12/203,719: Non-Final Office Action Mailed Jan. 23, 2013.

U.S. Appl. No. 12/203,719: Non-Final Office Action Mailed Jun. 26, 2012.

U.S. Appl. No. 12/203,719: Final Office Action Mailed Aug. 12, 2011.

U.S. Appl. No. 12/203,719: Non-Final Office Action Mailed Mar. 23, 2011.

B. Chandramouli et al., "Distributed Network Querying With Bounded Approximate Caching", Springer-Verlag Berlin Heidelberg, DASFAA 2006, LNCS 3882, pp. 374-388.

Boon-Chong Seet et al., "Route Discovery Optimization for Dynamic Source Routing in Mobile Ad Hoc Networks", Nanyang Technological University, School of Computer Engineering, Singapore, Article, Sep. 15, 2000.

R. Morien, "Agile Development of the Databases: A Focal Entity Prototyping Approach", Proceedings of Agile Development Conference, 2005, pp. 1-8. (Abstract Only).

J. Sack, "SQL Server 2008 Transact-SQL Recipes—Chapter 4: Tables", Springerlink, 2008, pp. 143-195.

G. Fernandez, "A Federated Approach to Enterprise Integration", Thesis, Swinburne University of Technology, Faculty of Information and Communication Technologies, 2006, pp. 1-215.

K. Subieta, "Mapping Heterogeneous Ontologies Through Object Views", Proceedings of 3rd Workshop on Engineering Federated Information Systems, 2000, pp. 1-10.

H. Kozankiewicz et al., "Implementation of Federated Databases Through Updatable Views", Springer Berlin Heidelberg, Advances in Grid Computing—EGC 2005, Lecture Notes in Computer Science, vol. 3470, 2005, pp. 610-619. (Abstract Only).

Bent et al., "Formal Properties of Distributed Database Networks", ACITA, Sep. 2007, pp. 1-7.

R. Ramakrishnan, "Database Management Systems", WCB/McGraw-Hill, 1998, (Abstract Only).

D. Lopresti et al., "A Tabular Survey of Automated Table Processing", Springer, Graphics Recognition Recent Advances, Lecture Notes in Computer Science vol. 1941, 200, pp. 93-120. (Abstract Only).

E. Marcos et al., "A Methodological Approach for Object-Relational Database Design Using UML", Springer, Software and Systems Modeling, Mar. 2003, vol. 2, Issue 1, pp. 59-72. (Abstract Only).

(56) References Cited

OTHER PUBLICATIONS

R.S. Mangrulkar et al., "Improving Route Selection Mechanism Using Trust Factor in AODV Routing Protocol for Manet", International Journal of Ocmputer Applications, vol. 7, No. 10, Oct. 2010, pp. 36-39.
X. Li, et al., "Trust-Based On-Demand Multipath Routing in Mobile Ad Hoc Networks", Information Security, IET, Dec. 2010, vol. 4, Issue 4, pp. 212-232. (Abstract Only).
Mohana et al., "Trust Based Routing Algorithms for Mobile Ad-Hoc Network", International Journal of Emerging Technology and Advanced Engineering, vol. 2, Issue 8, Aug. 2012, pp. 218-224.
Z. Liu et al., "A Dynamic Trust Model for Mobile Ad Hoc Networks", IEEE, Proceedings of the 10th International Workshop on Future Trends of Distributed Computing Systems, 2004, pp. 1-6.
Bent et al., "A Dynamic Distributed Federated Database", Second Annual Conference of ITA, Imperial College, London, Sep. 2008, pp. 1-8.

\* cited by examiner

ASSESSING RESPONSE ROUTES IN A NETWORK

STATEMENT REGARDING FEDERALLY SPONSORED RESEARCH OR DEVELOPMENT

This invention was made with Government support under Contract Number W911NF-06-3-0001 awarded by the United States Army. The Government has certain rights to this invention.

This application is based on and claims the benefit of priority from United Kingdom (GB) Patent Application 1302027.6, filed on Feb. 5, 2013, and herein incorporated by reference in its entirety.

BACKGROUND

This invention relates to the field of querying in network of connected nodes. In particular, the invention relates to assessing response routes in a network of connected nodes.

A network of connected nodes may be provided in the form of a distributed federated database system which is a type of metadata base management system (DBMS), which transparently maps multiple autonomous database systems into a single federated database. The constituent databases are distributed and interconnected via a computer network and may be geographically decentralized.

Through data abstraction, distributed federated database systems can provide a uniform user interface, enabling users and clients to store and retrieve data in multiple non-contiguous databases with a single query, even if the constituent databases are heterogeneous.

This form of query and response may be referred to as peer-to-peer information sharing as the networks provide data from one node to another node within the network.

The database systems may be static or may change dynamically. Ad-hoc dynamic distributed federated databases (DDFD) are known.

DDFDs use a "Store Locally Query Anywhere" mechanism (SLQA), which provides for global access to data from any vertex in the database network. Data is stored in local database tables at any vertex in the network and is accessible from any other vertex using Structured Query Language (SQL) like queries and distributed stored procedure-like processing. The DDFD comprises a set of interconnected vertices each of which is a federated Relational Database Management System (RDBMS) engine. By federated it is meant that the database engine is able to access internal and external sources as if it was one logical database. External sources may include other RDBMS or any other data source as flat files of data records.

DDFDs use distributed database query mechanisms to discover the distributed information sources that can respond to the query and aggregate the information across the network to return a single consolidated result-set to the querying node. This synchronous mechanism quickly finds the nodes that can contribute the required information and returns data to the requesting node by the current 'fastest route' but pays the penalty of using a constrained flood query to discover the sources of information.

DDFDs provide distributed data sources, which can be federated across a network of inter-connected self-organising DDFD nodes. In such networks, the data sources and DDFD nodes may be owned by different organisations some of which may be trusted (in some sense) whilst others may be non-trusted. This results in a problem of routes from source nodes passing through untrusted nodes.

In static networks (that are not changing rapidly) a trivial solution to this problem is to centrally determine the structure of the network and to compute the route(s) that minimise the distance between the querying node and the data source(s) via the minimum number of untrusted nodes. A node from which a query is to be launched could query this central system, asking if the data can be sent through a certain route. This central system can hold policy for all of the nodes and there interaction. This approach is not appropriate in the case of a DDFD, due to the dynamic and self-organising nature such systems.

Therefore, there is a need in the art to address the aforementioned problem in dynamic networks.

While the background and description are described in the context of a DDFD, the invention applies to other types of distributed database systems with peer-to-peer information sharing.

SUMMARY

According to one embodiment of the present invention, a method and/or computer program product assesses routes in a network of connected nodes, wherein a querying node propagates a query through multiple routes of intermediate nodes to a data source node and the data source node returns data to the querying node, and wherein the method at the data source node comprises: receiving, by one or more processors, a query instance comprising metadata with route information of a route of intermediate nodes in a network that a query instance has travelled through from a querying node to the data source node; comparing, by one or more processors, the route information to a route policy; and responding to, by one or more processors, a query instance that meets the route policy by returning a query response, to the query instance, via the route of intermediate nodes of the query instance.

According to one embodiment of the present invention, a system assesses routes in a network of connected nodes, wherein a querying node propagates a query through multiple routes of intermediate nodes to a data source node, wherein the data source node returns data to the querying node, and wherein the system comprises: a hardware data source node for receiving a query instance including metadata with route information of the route of intermediate nodes in the network that the query instance has travelled through from a querying node to the data source node; and a hardware route evaluator component for comparing the route information to a route policy; wherein the data source node responds to a query instance which meets the route policy by returning the query response via the route of intermediate nodes of the query instance.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system assess characteristics of nodes in routes between a querying node and a data source node that can respond to the issued query. In dynamic inter-connected networks there are multiple routes between a querying node and data source nodes which pass through other nodes in between. The nodes in the route may have different characteristics and a route policy may specify the required characteristics of the nodes through which a return response to a query may pass. For example, the characteristics of the nodes may include the trustworthiness or security of each node, the power availability at the nodes, the reliability of the nodes, the speed of processing of the nodes, or a combination of these characteristics.

In distributed database systems, a method is described for finding the most suitable return route to be used by a data source node for sending its response to a query given a route policy. The query is advanced onwards if the route meets the suitability criteria. In one embodiment, the nodes in a route must meet a security threshold for the route to be used as a return route. In another embodiment, a route may be selected if the reliability of the nodes in the route meets a reliability threshold.

Figure 1:
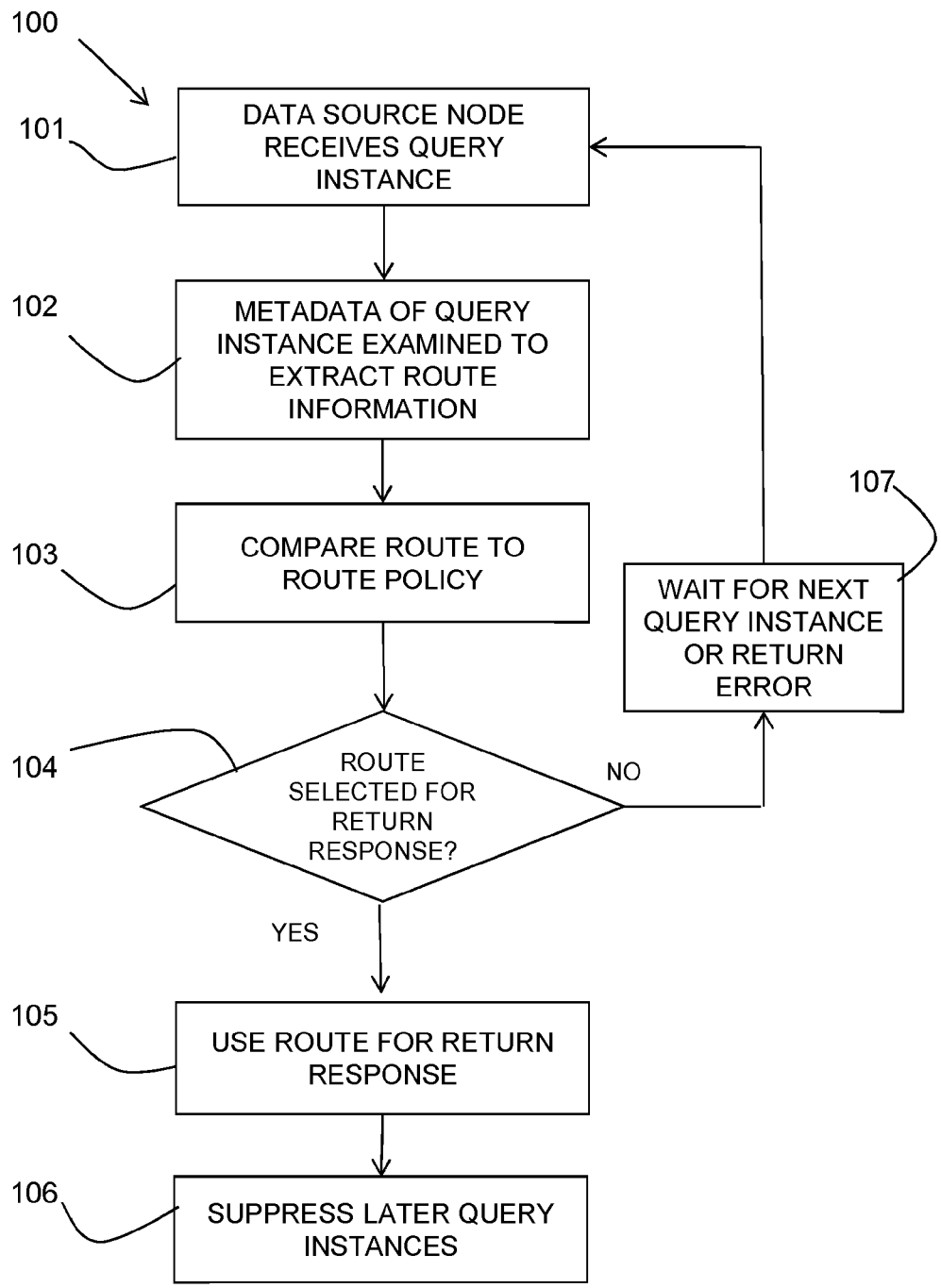
FIG. 1 is a flow diagram of a method in accordance with the present invention.

Referring to FIG. 1, a flow diagram 100 shows an example embodiment of the described method carried out at a data source node in a network, which is being queried for data, by another node in the network. The query may be propagated through the network using multiple routes resulting in more than one instance of the query arriving at the data source node.

The data source node may receive 101 a query instance and metadata of the query instance may be examined 102 to extract route information, which may have been gathered by the query instance as it was propagated through the network. The route information may be in the form of a list of nodes through which the query instance has passed and characteristics of each of the nodes.

The route information may be compared 103 to a route policy. The route policy may be stored at the data source node or may be accessed remotely by the data source node. The route policy may apply to multiple nodes. More than one route policy may be available for different forms of query.

The route policy may require the nodes through which the query instances pass to meet certain criteria. The nodes may be compared to the route policy based on the metadata collected during the query instance and/or additional stored information regarding a node.

In one example, the route policy may be based on the trustworthiness or security of the nodes in the route and a list the nodes though which a query instance has passed may be provided with an indication or scale of each node's trustworthiness or security. The nodes' trustworthiness or security may be given on an exclusion principle, wherein some nodes are excluded from being used. The route's trustworthiness or security may be given on a threshold principle, wherein the trustworthiness or security of each node is assessed and the total evaluated compared to a threshold. The trustworthiness or security may be based on access control policies and each node in a route must have the required access control policies to satisfy the security policy between the querying node and the data supplying node. The intermediate nodes may be examined to determine the least trusted node and it may be determined if the security of the least trusted node is acceptable.

It is determined 104 is a route is selected for a return response. In one embodiment, this selection may evaluate each query instance as it arrives and may select the first route that meets the route policy (see FIGS. 4a-4b below). In another embodiment, this selection may evaluate and compare multiple query instances, for example, arriving in a given time period via different routes and may select the most suitable route (see FIG. 5 below).

If no route is selected 104, the method may wait 107 of another instance of the query or may return an error that no route has been found which meets the route policy.

If a route is selected 104, the route may be used 105 by the data source node for the return response. Later query instances, which may be received, may be suppressed 106.

Figure 2:
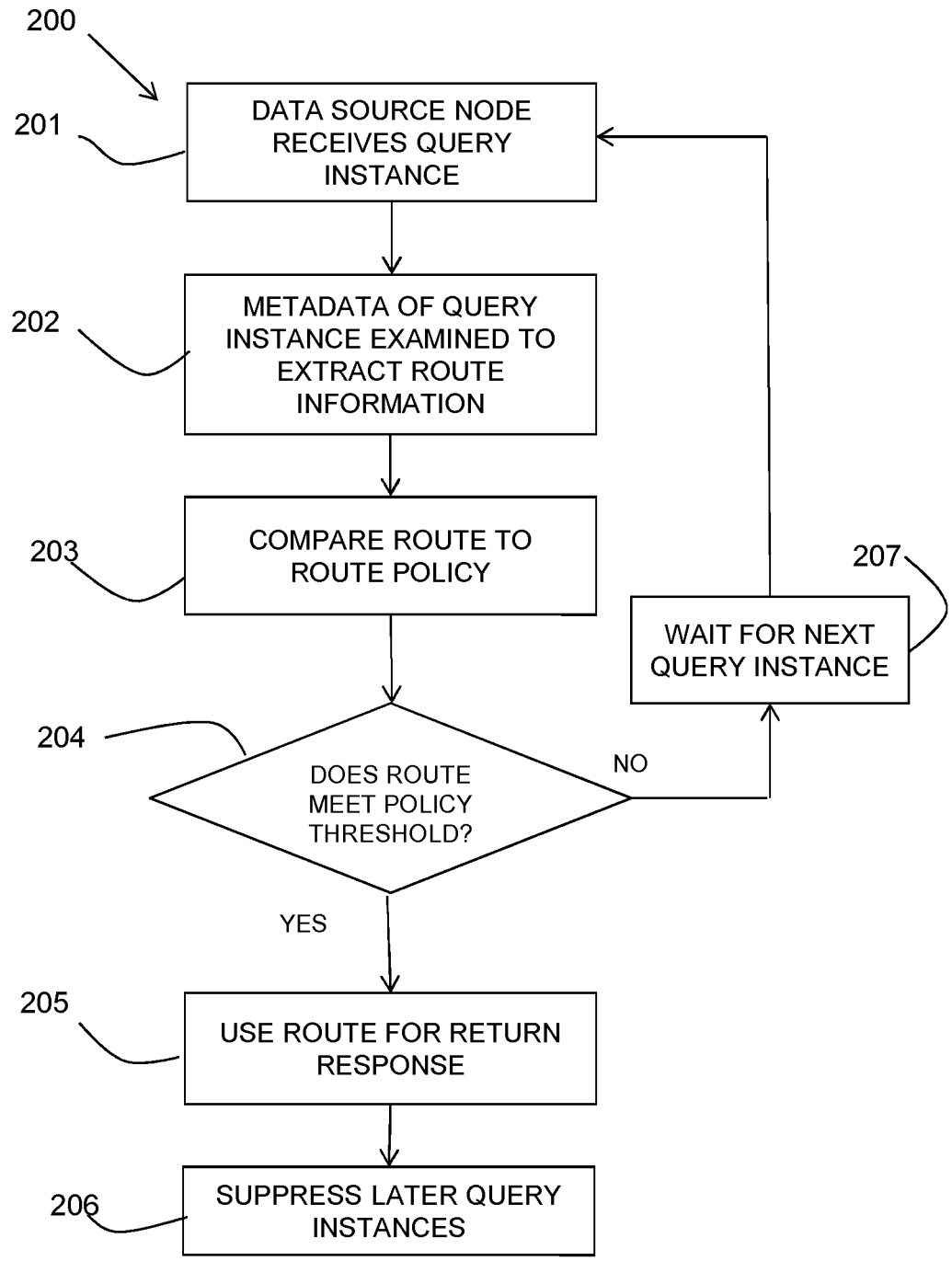
FIG. 2 is a flow diagram of an example embodiment of a method in accordance with the present invention.

Referring to FIG. 2, a flow diagram 200 shows a first embodiment of the described method at a data source node.

The data source node may receive 201 a query instance and as each query instance arrives its metadata may be examined 202 to extract route information, which may have been gathered by the query instance as it was propagated through the network. The route information may be in the form of a list of nodes through which the query instance has passed and characteristic information relating to each node. For example, the characteristic information may include security information, power availability or consumption, speed of processing, reliability, etc.

The route information for the query instance may be compared 203 to a route policy. The route policy may define which characteristics of the nodes are important and any criteria for characteristics which must be met. It may be determined 204 if the route of the query instance meets the policy threshold or requirements of the route policy. If it does not meet the policy threshold 204, the route may be rejected and the method may wait 207 for the next query instance to arrive at the data source node.

If the route does meet the policy threshold 204, the route may be immediately used for the return response. Later query instances that are received may be suppressed 206.

In this first embodiment, the route is dealt with on a first come first assessed basis. Once a suitable route is found, the other routes may be suppressed and not considered.

The route policy may look at each node in the route and if the all the nodes in the route are deemed to meet the policy criteria (either by an exclusion principle or by a threshold) then the query may be returned on that route. However, if the route does not meet the requirements of the policy, then the next route to arrive is assessed in the same way, until a suitable route is found.

As the query instances with different routes arrive at the data source node, a route may be either accepted, if it meets policy criteria, or rejected thereby waiting for the next route.

Figure 3:
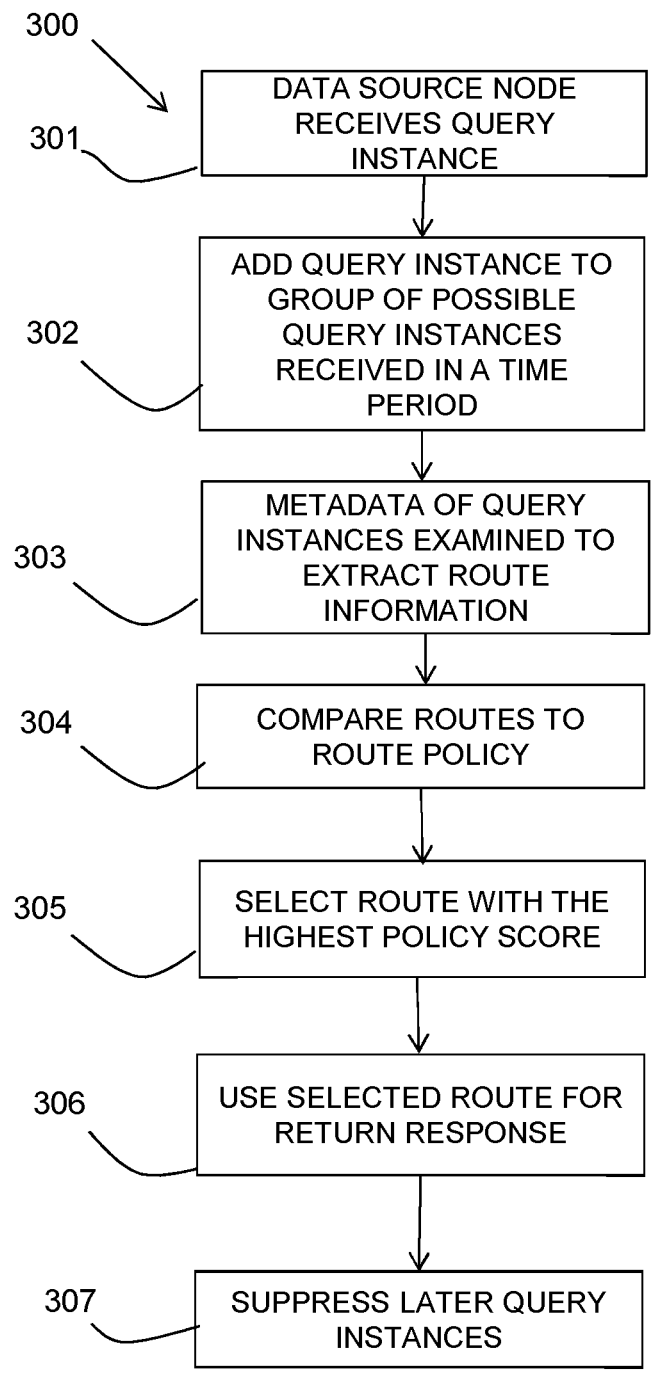
FIG. 3 is a flow diagram of an example embodiment of a method in accordance with the present invention.

Referring to FIG. 3, a flow diagram 300 shows a second embodiment of the described method at a data source node.

The data source node may receive 301 a query instance. The query instance may be added 302 to a group of instances of the same query that have arrived in a given time period. Metadata of the query instances may be examined 303 to extract route information from each query instance in the group.

The routes of the query instances may be compared 304 to a route policy and the route with the highest policy score may be selected 305. The selected route may be used 306 for the return response. Any later query instances that may be received may be suppressed 307.

In a further aspect of the described method, a first query instance may be received at the data source node which meets the route policy and the response may be sent using the return route of the first query instance. However, a subsequent query instance of the same query may be received which has a higher score for the route policy. The response may be resent via the route of the subsequent query instance.

For example, this may apply where the route policy relates to the speed of delivery of the response for a required bandwidth. If a subsequent query instance arrives with a better solution, the response may be partially or wholly resent in order to use the more optimum characteristics of the later path.

Figure 4A:
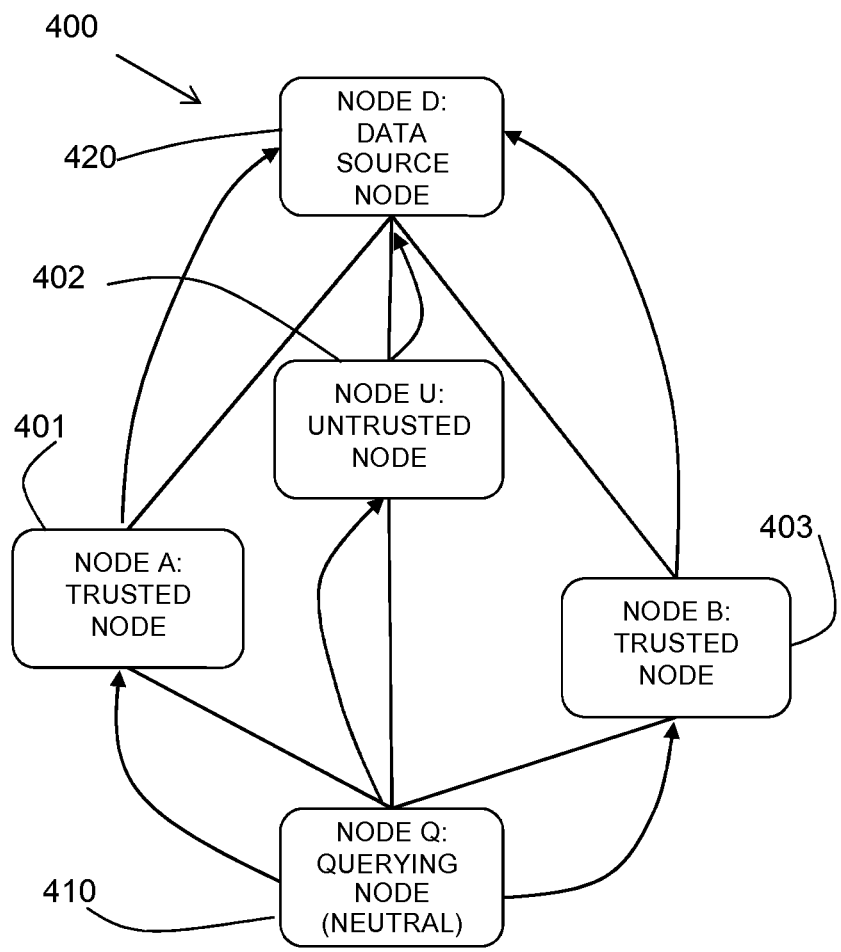
FIG. 4a is a schematic diagram of an example embodiment of a network system illustrating the problem addressed by the present invention.

Referring to FIG. 4a, a schematic diagram 400 shows an example of the problem addressed by the described method and system in the scenario of the trustworthiness of the nodes.

A dynamic distributed federated database (DDFD) provides distributed data sources, which can be federated across a network of inter-connected self-organising DDFD nodes 401-403, 410, 420.

Data can be stored at any node in the DDFD. Queries can be performed at any node requesting information from any other node in the network. The query propagates through the network and result sets are returned to the querying node. The nodes manage the forward routing of queries so as to minimise the number of copies of the same query. Each node that forwards the query is responsible for processing the results obtained from nodes to which the query was forwarded, leading to a distributed aggregation of results.

In such networks, the data sources and DDFD nodes may be owned by different organisations some of which may be trusted 401, 403 whilst others may be non-trusted 402.

In the described example, a dynamic network of nodes 400 may include a querying node 410 (Node Q), which may be neutral, which wishes to retrieve data from a data source node 420 (Node D). The querying node 410 (Node Q) propagates a query to nodes 401-403 in the network 400. The nodes 401-403 manage the forward routing of the query to the data source node 420 (Node D). A query issued by any node in the DDFD may propagate through the network using a 'controlled flood' mechanism in which nodes propagate the query to other nodes Between Node Q 410 and Node D 420 there are three Nodes A, U, B 401-403 through which data from Node D 420 may be returned. Node D 420 wishes to have control over who sees the data being returned to Node Q 410. In this example, Node U 402 is untrusted and, therefore, a potentially hostile party.

The query may be broadcast on three different routes from Node Q 410 to Nodes A, U and B 401, 402, 403 to Node D (420). In known DDFDs, the route (via A, U or B) by which the query arrives fastest will be the route that the data is returned on. The system then suppresses queries at the data source node 420 that it has seen before, to reduce communication in the network. This means that Node D 420 may not see the query arriving from other routes. As Node U 402 may well be the fastest route, data may be sent through hostile or insecure nodes compromising security.

The proposed method determines whether routes by which the query reached the data source node (Node D), are sufficiently secure, as assessed by a security policy at Node D. This security policy may be applied by each data source node in a network.

The described method and system make use of the metadata associated with a query. As the query propagates through the network it records the route it takes in the form of the nodes it passes through in the metadata. There are many routes by which the query can reach the data source node, with some routes being more secure than others (passing through a minimum or no untrusted nodes).

The routes are assessed at a data source node, comparing the nodes through which the route has passed to a security policy.

When a query arrives at a data source node, the route in the form of a list of nodes by which the query has traveled is part of the query metadata. This route may be compared to a security policy of the data source node which may contain a list of parties the data should or should not pass through.

Figure 4B:
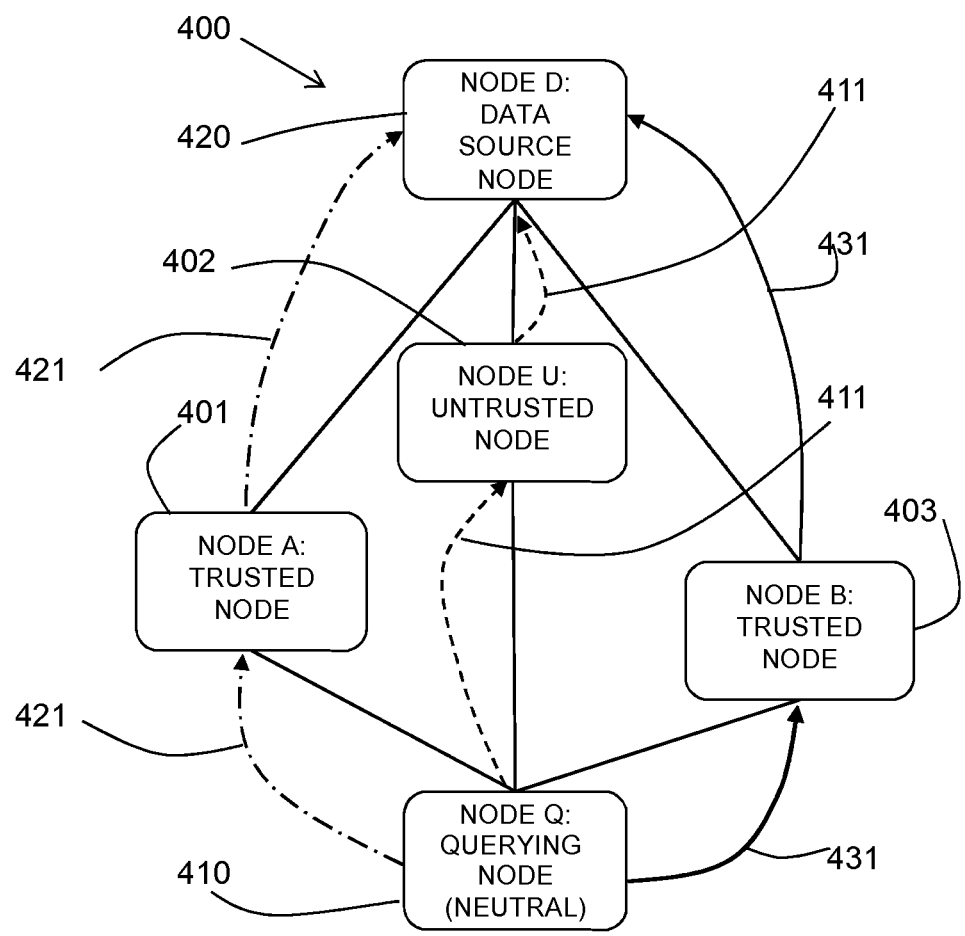
FIG. 4b is a schematic diagram of the example embodiment of FIG. 4a, with optional routes shown in accordance with the present invention.

Referring to FIG. 4b, the example of FIG. 4a is shown. The example of FIG. 4a may be represented as the following:

Trusted Nodes TN={A, B}
Untrusted Nodes UN={U}

The routes from the querying node 410 to the data source node 420 may be recorded as follows in the metadata of the query:

PATH={{Q,U,D}, {Q,A,D}, {Q,B,D}}*

In this example, a route policy at the data source node 420 may be a security policy and may determine for a query arriving using a route, if it meets an example security policy of having no untrusted nodes in the route.

```
For each PATH
begin
    if [UN] is a member of [PATH] Reject
    else CHOOSEN_PATH = PATH
end
```

The query may arrive at the data source node 420 via route {Q, U, D} 411. However, this route 411 includes an untrusted node (Node U) 402 and is therefore rejected by the security policy. A next instance of the query may arrive at the data source node 420 via route {Q, A, D} 421. The route 421 meets the security policy and is therefore accepted and the query returned along this route. If a further instance of the query arrives at the data source node 420 via route {Q, B, D} 431, this is supressed as the query has already been returned.

Figure 5:
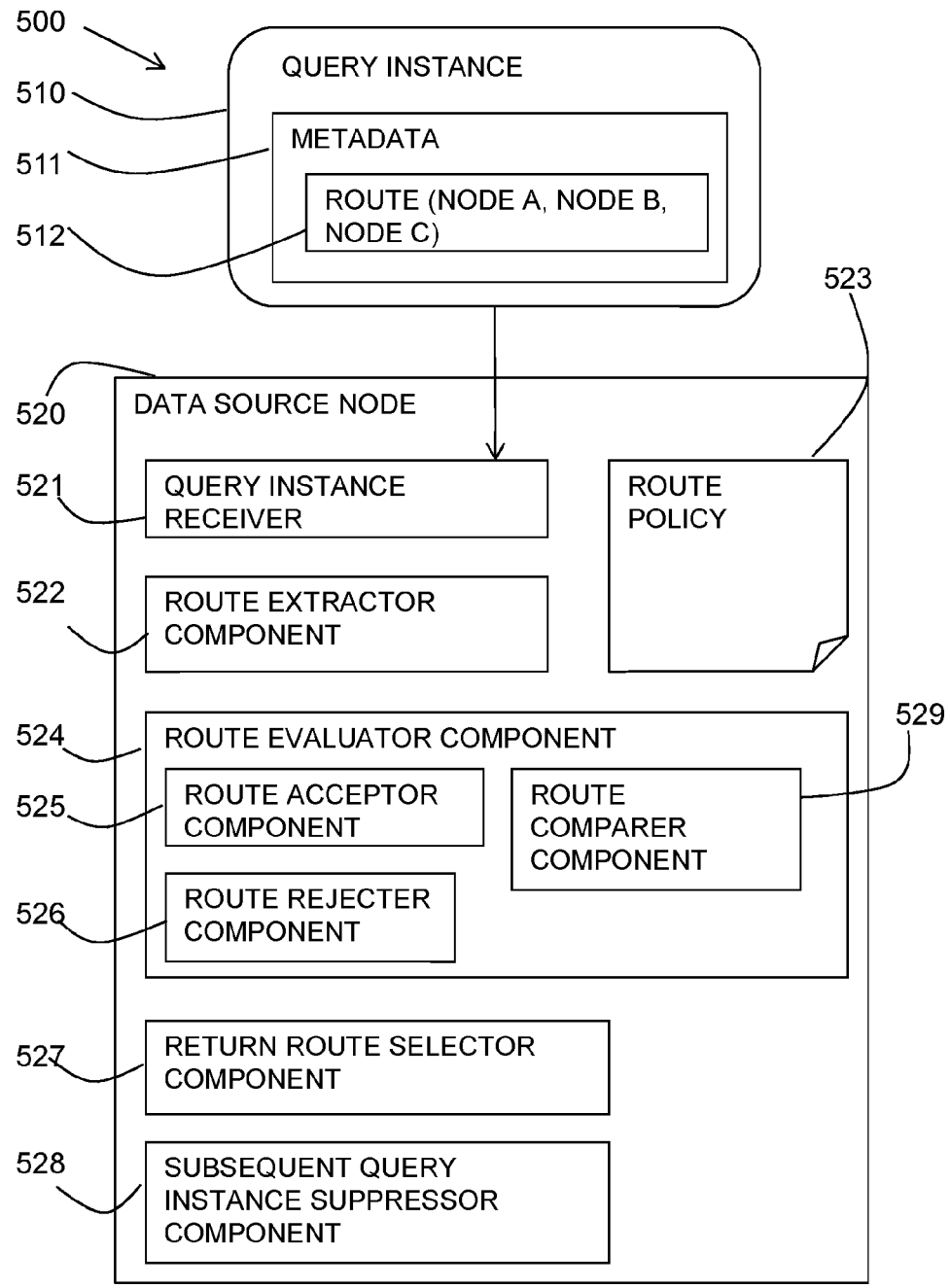
FIG. 5 is block diagram of an example embodiment of a system in accordance with the present invention.

Referring to FIG. 5, a block diagram shows an example embodiment of the described system 500.

A query instance 510 may be propagated through a network from a querying node, via other intermediary nodes to a data source node 520. Each query instance 510 may take different routes from the querying node to the data source node. A query instance 510 may include metadata 511 which may include route information 512 gathered as the query instance propagates through the network. The route information 512 may include a list of nodes that the query instance 510 has passed through and characteristics of each node.

A data source node 520 may include a query instance receiver 521 for receiving an instance of a query. It may also include a route extractor component 522 for extracting the route information 512 from the query instance 510 as it is received at the query instance receiver 521.

The data source node 520 may have one or more route policies 523 which may be stored locally or accessed from a remote location. The route policies 523 may defined the required characteristics of the nodes through which the query instance has travelled and therefore though which a return response will pass.

A data source node 520 may include a route evaluator component 524 for evaluating whether routes of query instances meet the route policy/policies. In one embodiment, the route evaluator component 524 may include a route acceptor component 525 and a route rejecter component 526 for accepting/rejecting routes on a first come first served basis. In another embodiment, the route evaluator component 524 may include a route comparer component 529 for comparing multiple routes for query instances received in a given time period.

The route extractor component 522, route policy/policies 523 and the route evaluator component 524 may all be provided remotely to the data source node 520 and query instances may be processed remotely and the selected route returned to the data source node 520 once selected.

The data source node 520 may include a return route selector component 527 for selecting a route and returning the response to the query via the route. The data source node 520 may also include a subsequent query instance suppressor component 528 for suppressing subsequently received query instances for a query which has been returned.

Figure 6:
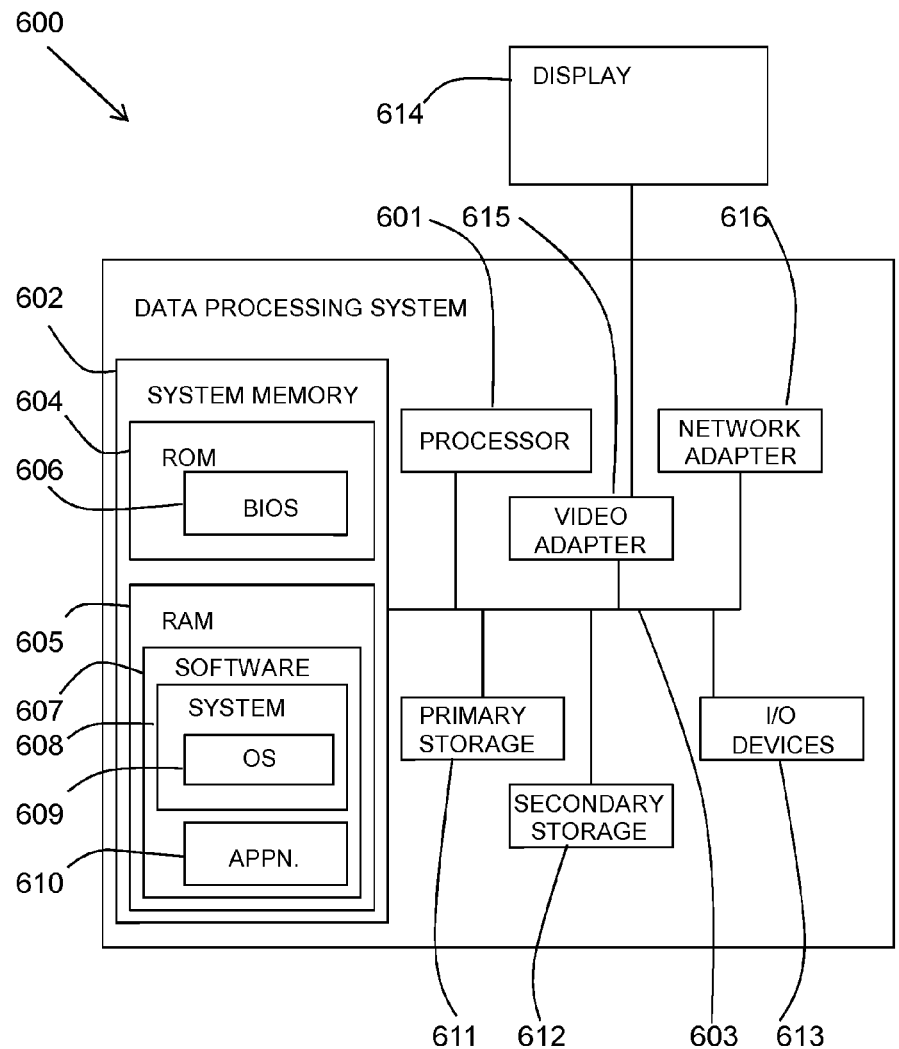
FIG. 6 is a block diagram of an embodiment of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Thus, as described herein and according to a first aspect of the present invention there is provided a method for assessing routes in a network of connected nodes wherein a querying node propagates a query through multiple routes of intermediate nodes to a data source node and the data source node returns data to the querying node, the method at a data source node comprising: receiving a query instance including metadata with route information of the route of intermediate nodes in the network that the query instance has travelled through from a querying node to the data source node; comparing the route information to a route policy; and responding to a query instance which meets the route policy by returning the query response via the route of intermediate nodes of the query instance.

In one embodiment, comparing the route information to a route policy may include: determining if a route of a received query instance meets a route policy; using the route of a first received query instance that meets the route policy as the return route.

In another embodiment, comparing the route information to a route policy may include: receiving multiple query instances in a given time period; comparing the routes of the query instances to the route policy; and selecting the route having a highest policy score as the return route.

The method may include suppressing any query instances for a query which has already been responded to.

The metadata with route information of the route of intermediate nodes in the network that the query instance has travelled through may include characteristics of each of the intermediate nodes. The characteristics of each of the intermediate nodes may include one or more of the group of: security or trustworthiness of a node, the power availability at a node, reliability of a node, speed of processing of a node, or other performance related characteristic of a node. The route policy may define the required characteristics of the intermediate nodes.

In one embodiment, a route policy may be a security policy that lists nodes and a measure of the trustworthiness of each node. A security policy may provide a security threshold of aggregate measures of the nodes in a route. A security policy may list nodes which are not secure and through which a route should not pass.

One or more route policies may be provided for different types of query received at the data source node.

The method may include: receiving a first query instance at the data source node which meets the route policy; sending a response using the return route of the first query instance; receiving a subsequent query instance for the same query which has a higher score for the route policy; and resending all or part of the response via the route of the subsequent query instance.

According to a second aspect of the present invention there is provided a system for assessing routes in a network of connected nodes wherein a querying node propagates a query through multiple routes of intermediate nodes to a data source node and the data source node returns data to the querying node, comprising: a data source node for receiving a query instance including metadata with route information of the route of intermediate nodes in the network that the query instance has travelled through from a querying node to the data source node; and a route evaluator component for comparing the route information to a route policy; wherein the data source node responds to a query instance which meets the route policy by returning the query response via the route of intermediate nodes of the query instance.

In one embodiment, the route evaluator component for comparing the route information to a route policy may be for: determining if a route of a received query instance meets a route policy; using the route of a first received query instance that meets the route policy as the return route.

In another embodiment, the route evaluator component for comparing the route information to a route policy may be for: receiving multiple query instances in a given time period; comparing the routes of the query instances to the route policy; and selecting the route having a highest policy score as the return route.

The system may include a subsequent query instance suppressor component for suppressing any query instances for a query which has already been responded to.

The system may include a route extractor component for extracting metadata with route information of the route of intermediate nodes in the network that the query instance has travelled through including characteristics of each of the intermediate nodes.

According to a third aspect of the present invention there is provided a computer program product for assessing routes in network of connected nodes wherein a querying node propagates a query through multiple routes of intermediate nodes to a data source node and the data source node returns data to the querying node, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of using a route, which meets the requirements of a predefined policy when returning data from a source node to a querying node in the network.

Improvements and modifications can be made to the foregoing without departing from the scope of the present invention.

What is claimed is:

1. A method for assessing routes in a network of connected nodes, wherein a querying node propagates a query through multiple routes of intermediate nodes to a data source node and the data source node returns data to the querying node, and wherein the method at the data source node comprises:

receiving, by one or more processors, a query instance comprising metadata with route information of a route of intermediate nodes in a network that the query instance has travelled through from a querying node to the data source node, wherein the network is a network of connected nodes through which the query instance is propagated;

comparing, by one or more processors, the route information to a route policy;

responding to, by one or more processors, the query instance that meets the route policy by returning a query response to the query instance via the route of intermediate nodes used by the query instance, wherein the query instance is a first query instance, wherein the route of intermediate nodes in the network is a first route of intermediate nodes in the network; receiving a second query instance at the data source node, wherein the second query instance and the first query instance present a same data query, wherein the data source node received the second query instance after receiving the first query instance, and wherein the second query instance used a second route of intermediate nodes in the network that is different from the first route of intermediate nodes in the network; determining, by one or more processors, that the second route of intermediate nodes is faster than the first route of intermediate nodes; and in response to determining that the second route of intermediate nodes is faster than the first route of intermediate nodes, sending the query response to the querying node via the second route of intermediate nodes.

2. The method as claimed in claim 1, wherein comparing the route information to the route policy comprises:
determining, by one or more processors, whether a route of a received query instance meets the route policy; and
using, by one or more processors, the route of a first received query instance that meets the route policy as the return route.

3. The method as claimed in claim 1, wherein comparing the route information to a route policy comprises: receiving, by one or more processors, multiple query instances in a given time period; comparing, by one or more processors, routes of the multiple query instances to the route policy; and selecting, by one or more processors, a route having a highest policy score as a return route.

4. The method as claimed in claim 1, further comprising:
suppressing, by one or more processors, any query instances for a query that has already been responded to.

5. The method as claimed in claim 1, wherein the metadata with route information of the route of intermediate nodes in the network that the query instance has travelled through includes characteristics of each of the intermediate nodes.

6. The method as claimed in claim 5, wherein the characteristics of each of the intermediate nodes includes:
security of a node,
trustworthiness of a node,
the power availability at a node,
reliability of a node, and
speed of processing of a node.

7. The method as claimed in claim 1, wherein the route policy defines required characteristics of the intermediate nodes.

8. The method as claimed in claim 1, wherein the route policy is a security policy that lists nodes and a measure of trustworthiness of each node.

9. The method as claimed in claim 8, wherein the security policy provides a security threshold of aggregate measures of nodes in a route.

10. The method as claimed in claim 8, wherein the security policy lists nodes which are not secure and through which a route should not pass.

11. The method as claimed in claim 1, wherein one or more route policies are provided for different types of queries received at the data source node.

12. The method as claimed in claim 1, further comprising:
receiving, by one or more processors, a first query instance at the data source node which meets the route policy;
sending, by one or more processors, a response using a return route of the first query instance;
receiving, by one or more processors, a subsequent query instance for a same query which has a higher score for the route policy; and
resending, by one or more processors, all or part of the response via a route of the subsequent query instance.

13. A system for assessing routes in a network of connected nodes, wherein a querying node propagates a query through multiple routes of intermediate nodes to a data source node, wherein the data source node is a hardware data source node that returns data to the querying node, and wherein the system comprises: a hardware data source node for receiving a query instance including metadata with route information of the route of intermediate nodes in the network that the query instance has travelled through from a querying node to the hardware data source node, wherein the network is a network of connected nodes through which the query instance is propagated; and a hardware route evaluator component for comparing the route information to a route policy; wherein the hardware data source node responds to a query instance which meets the route policy by returning the query response via the route of intermediate nodes used by the query instance, wherein the query instance is a first query instance, wherein the route of intermediate nodes in the network is a first route of intermediate nodes in the network, wherein the hardware route evaluator component receives a second query instance at the hardware data source node, wherein the second query instance and the first query instance present a same data query, wherein the hardware data source node receives the second query instance after receiving the first query instance, wherein the second query instance uses a second route of intermediate nodes in the network that is different from the first route of intermediate nodes in the network, wherein the hardware route evaluator component determines that the second route of intermediate nodes is faster than the first route of intermediate nodes, and wherein the hardware route evaluator component, in response to determining that the second route of intermediate nodes is faster than the first route of intermediate nodes, sends the query response to the querying node via the second route of intermediate nodes.

14. The system as claimed in claim 13, wherein the hardware route evaluator component for comparing the route information to the route policy is for: determining if a route of a received query instance meets the route policy;
using a route of the first received query instance that meets the route policy as a return route.

15. The system as claimed in claim 13, wherein the hardware route evaluator component for comparing the route information to the route policy is for: receiving multiple query instances in a given time period; comparing routes of the multiple query instances to the route policy; and selecting a route having a highest policy score as a return route.

16. The system as claimed in claim 13, further comprising:
a subsequent query instance suppressor component for suppressing any query instances for a query which has already been responded to.

17. The system as claimed in claim 13, further comprising:
a route extractor component for extracting metadata with route information of a route of intermediate nodes in the network that the query instance has travelled through, wherein the metadata comprises characteristics of each of the intermediate nodes.

18. A computer program product for assessing routes in a network of connected nodes, wherein a querying node propagates a query through multiple routes of intermediate nodes to a data source node, wherein the data source node returns data to the querying node, wherein the computer program product comprises a non-transitory computer readable storage medium having program code embodied therewith, the program code readable and executable by a processor to perform a method comprising: receiving a query instance comprising metadata with route information of a route of intermediate nodes in a network that a query instance has travelled through from a querying node to the data source node, wherein the network is a network of connected nodes through which the query instance is propagated; comparing the route information to a route policy;

responding to a query instance that meets the route policy by returning a query response, to the query instance, via the route of intermediate nodes used by the query instance, wherein the query instance is a first query instance, wherein the route of intermediate nodes in the network is a first route of intermediate nodes in the network; receiving a second query instance at the data source node, wherein the second query instance and the first query instance present a same data query, wherein the data source node received the second query instance after receiving the first query instance, and wherein the second query instance used a second route of intermediate nodes in the network that is different from the first route of intermediate nodes in the network; determining that the second route of intermediate nodes is faster than the first route of intermediate nodes; and in response to determining that the second route of intermediate nodes is faster than the first route of intermediate nodes, sending the query response to the querying node via the second route of intermediate nodes.

19. The method of claim 1, wherein the route information in the metadata is gathered as the query instance propagates through nodes in the network.

* * * * *